US012594904B2

(12) United States Patent
Cruz Hernandez

(10) Patent No.: US 12,594,904 B2
(45) Date of Patent: Apr. 7, 2026

(54) MIRROR ASSEMBLIES FOR VEHICLES INCLUDING AN ANTI-THEFT COUNTERMEASURE

(71) Applicant: Nissan North America, Inc., Franklin, TN (US)

(72) Inventor: Arturo Cruz Hernandez, Mexico City (MX)

(73) Assignee: Nissan North America, Inc., Franklin, TN (US)

( * ) Notice: Subject to any disclaimer, the term of this patent is extended or adjusted under 35 U.S.C. 154(b) by 1020 days.

(21) Appl. No.: 17/579,986

(22) Filed: Jan. 20, 2022

(65) Prior Publication Data

US 2023/0226997 A1 Jul. 20, 2023

(51) Int. Cl.
B60R 25/01 (2013.01)
B60R 1/06 (2006.01)

(52) U.S. Cl.
CPC ............... B60R 25/01 (2013.01); B60R 1/06 (2013.01)

(58) Field of Classification Search
CPC .................... B60R 25/00–406; B60R 1/00–31
See application file for complete search history.

(56) References Cited

U.S. PATENT DOCUMENTS

| | | | |
|---|---|---|---|
| 4,488,778 A | 12/1984 | Polzer et al. | |
| 4,696,555 A | 9/1987 | Enomoto | |
| 4,867,408 A | 9/1989 | Ozaki | |
| 4,877,214 A | 10/1989 | Toshiaki et al. | |
| 4,981,279 A | 1/1991 | Andreas et al. | |
| 5,604,645 A | 2/1997 | Weaver | |
| 5,721,646 A | 2/1998 | Catlin et al. | |
| 6,325,519 B1 | 12/2001 | Lang | |
| 9,840,200 B2 | 12/2017 | de Swardt et al. | |
| 10,654,416 B2 | 5/2020 | Cano et al. | |
| 2002/0001147 A1 | 1/2002 | Zapadinsky | |
| 2006/0245025 A1* | 11/2006 | Tonar ......................... | B60R 1/08 359/265 |
| 2010/0296189 A1 | 11/2010 | Lettis et al. | |
| 2017/0059814 A1* | 3/2017 | Lang ......................... | B60R 1/06 |
| 2019/0071016 A1 | 3/2019 | Lettis et al. | |
| 2020/0276935 A1* | 9/2020 | Ballarin .................... | B60R 1/06 |
| 2023/0226997 A1 | 7/2023 | Cruz Hernandez | |

\* cited by examiner

*Primary Examiner* — Christopher A Lamb, II

(74) *Attorney, Agent, or Firm* — Young Basile Hanlon & MacFarlane, P.C.

(57) ABSTRACT

A mirror assembly for a vehicle is disclosed that includes: a support bracket with first clips; a mirror glass that is supported by the support bracket; a housing with retainers that are configured for engagement with the first clips to thereby connect the housing and the support bracket; and a locking bracket that is configured for positioning about the housing. The locking bracket includes second clips that are configured for engagement with the retainers and the first clips to thereby securely connect the housing to the support bracket. The second clips extend outwardly from the locking bracket along radial axes.

20 Claims, 6 Drawing Sheets

302iii

100

MIRROR ASSEMBLIES FOR VEHICLES INCLUDING AN ANTI-THEFT COUNTERMEASURE

TECHNICAL FIELD

The present disclosure relates to mirror assemblies for vehicles. More specifically, the present disclosure relates to mirror assemblies (e.g., side-view mirror assemblies) that include a countermeasure to inhibit (if not entirely prevent) theft of the mirror glass.

BACKGROUND

While certain efforts have been made to combat the theft of (side-view) mirror assemblies in vehicles, known countermeasures often intrude upon the mirror glass, thereby compromising visibility, and/or require the use of an adhesive, which can result in unreliable fixation due to variations in the materials of construction used by the OEMs (original equipment manufacturers).

The present disclosure addresses these issues, however, and describes mirror assemblies including an anti-theft countermeasure that mechanically secures the mirror glass while maintaining full visibility.

SUMMARY

In one aspect of the present disclosure, a mirror assembly for a vehicle is disclosed that includes: a support bracket with first clips; a mirror glass that is supported by the support bracket; a housing with retainers that are configured for engagement with the first clips to thereby connect the housing and the support bracket; and a locking bracket that is configured for positioning about the housing. The locking bracket includes second clips that extend outwardly therefrom along radial axes, and which are configured for engagement with the retainers and the first clips to thereby securely connect the housing to the support bracket.

In certain embodiments, the locking bracket may be adhesively connected to the housing.

In certain embodiments, the second clips may include alignment features that are configured for engagement with the retainers to facilitate proper registration of the support bracket, the housing, and the locking bracket.

In certain embodiments, the alignment features may extend outwardly from the locking bracket in transverse relation to the radial axes.

In certain embodiments, the alignment features may extend axially from the locking bracket and away from the mirror glass.

In certain embodiments, the second clips may include anchors that are configured for positioning between the support bracket and the housing to inhibit separation of the support bracket and the mirror glass from the housing.

In certain embodiments, the anchors may extend radially from the second clips.

In certain embodiments, the first clips may include arms that extend towards the housing.

In certain embodiments, the second clips may define receptacles that are configured to receive the arms.

In certain embodiments, the second clips may each include a first leg that is positioned radially inward of the anchors and a second leg that is positioned radially outward of the anchors.

In certain embodiments, the receptacles may be defined by the first leg and the second leg.

In certain embodiments, the second clips may include a non-metallic material and a metallic material.

In certain embodiments, the metallic material may inhibit radial deformation of the second clips.

In certain embodiments, the locking bracket may include a body that is configured to receive the housing.

In certain embodiments, the body may include a collar defining an aperture that is configured to receive the housing such that the housing extends into the collar.

In another aspect of the present disclosure, a mirror assembly for a vehicle is disclosed that includes: a bracket that supports a mirror glass; a housing that is located forwardly of the bracket and which is configured for connection thereto; and an anti-theft countermeasure that is located forwardly of the housing such that the housing is positioned between the bracket and the anti-theft countermeasure. The anti-theft countermeasure is configured for engagement with the bracket to thereby lock the housing in relation to the bracket and inhibit separation of the housing from the bracket.

In certain embodiments, the anti-theft countermeasure may include clips that extend outwardly therefrom along radial axes.

In certain embodiments, the clips may be configured for positioning between the bracket and the housing.

In certain embodiments, the clips may include: anchors; a first leg that is positioned radially inward of the anchors; and a second leg that is positioned radially outward of the anchors.

In certain embodiments, the anchors may be configured for engagement with corresponding flanges defined by arms extending from the bracket such that the anchors are positionable between the flanges and the housing.

In certain embodiments, the clips may include a non-metallic material and a metallic material.

In certain embodiments, the metallic material may be configured as an overlay.

In certain embodiments, the overlay may inhibit radial deformation of the clips.

In another aspect of the present disclosure, a method of assembling a mirror assembly for a vehicle is disclosed that includes: connecting a housing to a bracket configured to support a mirror glass; positioning an anti-theft countermeasure about the housing such that the housing extends into the anti-theft countermeasure; and connecting the anti-theft countermeasure to the bracket such that the housing is captured therebetween.

In certain embodiments, connecting the anti-theft countermeasure to the bracket may include positioning anchors on the anti-theft countermeasure between the housing and corresponding flanges defined by arms extending from the bracket.

In certain embodiments, connecting the anti-theft countermeasure to the bracket may include inserting the arms into receptacles defined by the anti-theft countermeasure.

BRIEF DESCRIPTION OF THE DRAWINGS

According to common practice, the various features of the drawings may not be to scale and may be arbitrarily expanded or reduced for clarity.

FIG. 1 is a top, perspective view of a (side-view) mirror assembly for a vehicle according to one embodiment of the present disclosure, which includes: a support bracket with a mirror glass affixed thereto; an inner housing that is configured for connection to the support bracket; an anti-theft countermeasure (e.g., a locking bracket) that is configured for connection to the support bracket; and an outer housing (e.g., a shell).

FIG. 2 is a top, perspective view of the mirror assembly with parts separated.

DETAILED DESCRIPTION

The present disclosure describes a mirror assembly (e.g., a side-view mirror assembly) for a vehicle that includes a (first) support bracket; a mirror glass that is supported by (e.g., affixed to) the support bracket; a housing that is configured for engagement with the support bracket; and an anti-theft countermeasure, which is configured as a locking (retention) bracket that is positionable about the housing.

The anti-theft countermeasure is configured for engagement with both the support bracket and the housing to thereby lock the housing in relation to the support bracket and, thus, deter theft of the mirror glass. The anti-theft countermeasure includes clips with alignment features that facilitate proper registration of the support bracket, the housing, and the anti-theft countermeasure, as well as anchors that are configured for positioning between the support bracket and the housing to inhibit separation of the housing from the support bracket.

In certain embodiments, the anti-theft countermeasure may be adhesively connected to the housing and/or may include both non-metallic and metallic materials. In such embodiments, the metallic materials inhibit radial deformation (e.g., bending) of the clips on the anti-theft countermeasure and, thus, separation of the support bracket, the housing, and the anti-theft countermeasure.

Figures 1, 2:
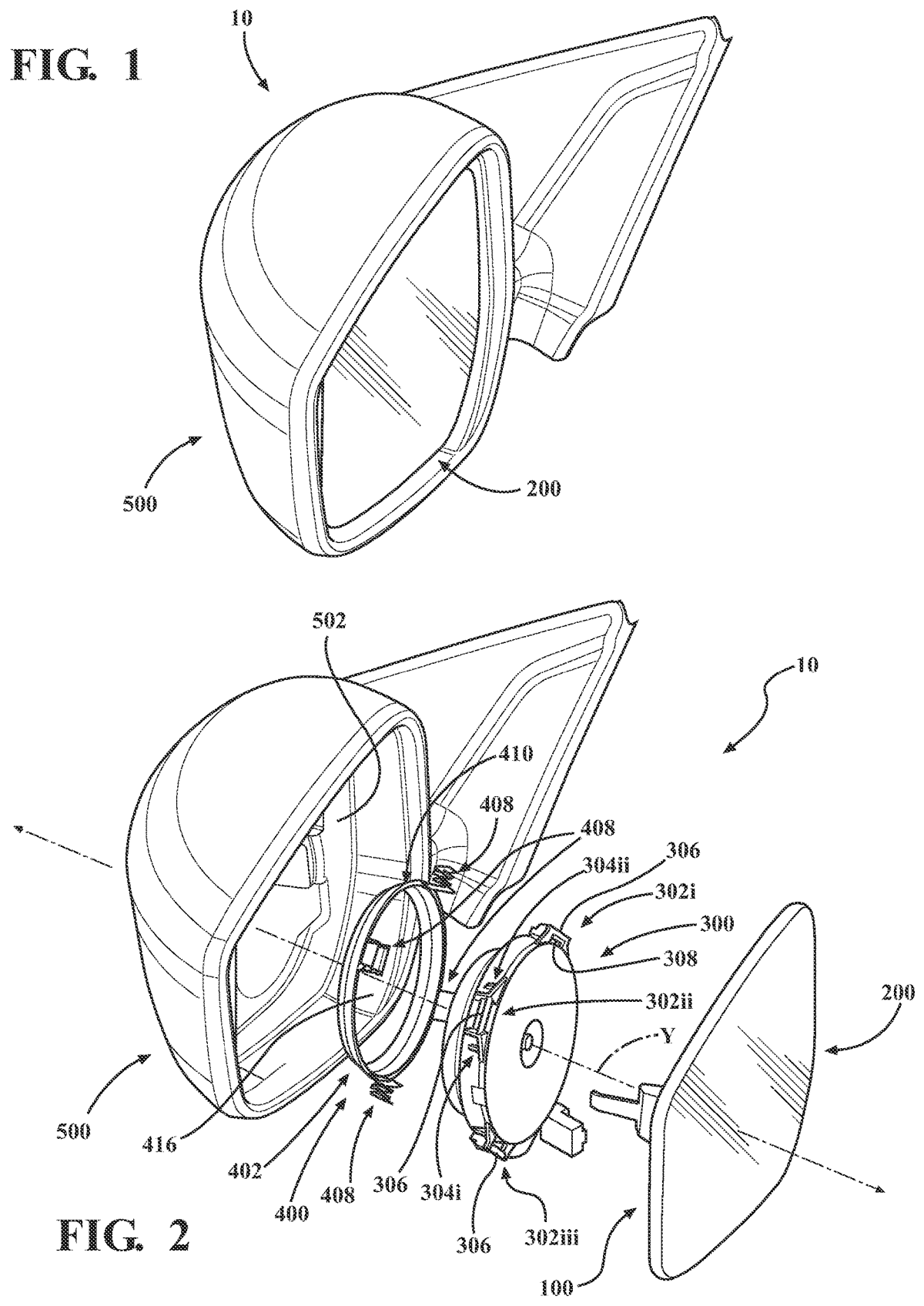
Figure 3:
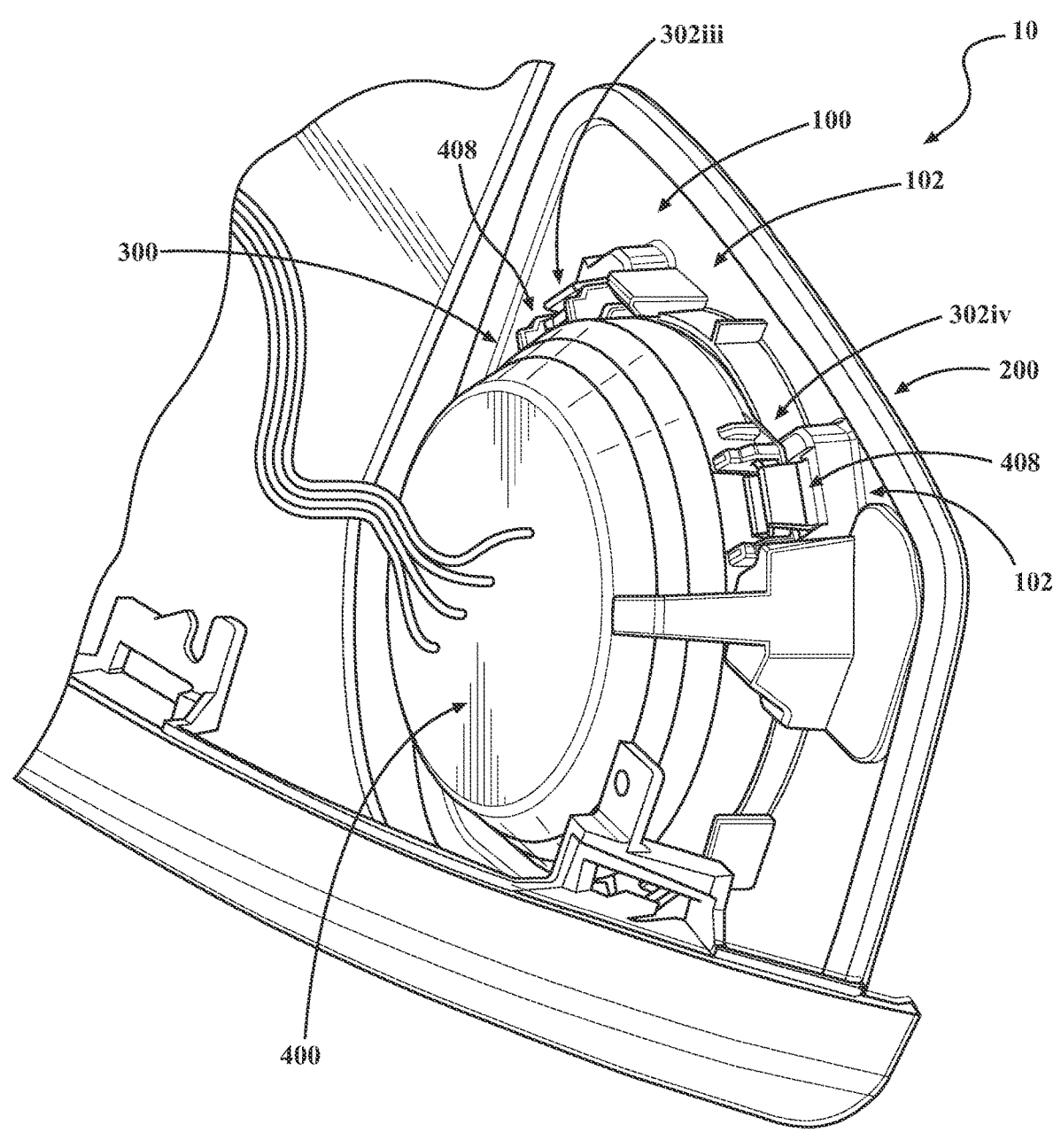
FIG. 3 is a partial, side, perspective view of the mirror assembly.

With reference to FIGS. 1-3, a mirror assembly 10 for a vehicle is illustrated that includes: a support (first) bracket 100; a mirror glass 200 that is supported by (e.g., affixed or otherwise connected to) the support bracket 100 (e.g., via an adhesive); an inner (first) housing 300 that is located forwardly (axially, longitudinally inward) of the support bracket 100 and the mirror glass 200; an anti-theft countermeasure 400 that is located forwardly (axially, longitudinally inward) of the inner housing 300; and an outer (second) housing (e.g., a shell) 500, which defines an internal chamber 502 (FIG. 2) that is configured to receive the support bracket 100, the inner housing 300, and the anti-theft countermeasure 400, which is the subject of the present disclosure. Although illustrated and described in the context of a side-view mirror assembly on a passenger vehicle, it should be appreciated that the principles of the present disclosure are equally applicable to a variety of vehicles (e.g., trucks, SUVs, vans, boats, airplanes, trains, etc.) and mirror assemblies.

The support bracket 100 is configured for connection to both the inner housing 300 and the outer housing 500 (along an axis of assembly Y (FIG. 2)) such that the inner housing 300 is positioned (located, captured) between the anti-theft countermeasure 400 and the support bracket 100 (as well as the mirror glass 200) within the internal chamber 502 defined the outer housing 500. The outer housing 500 thus conceals and protects the internal components of the mirror assembly 10 (e.g., the support bracket 100, the inner housing 300, and the anti-theft countermeasure 400). More specifically, the support bracket 100 and the inner housing 300 include (first) clips 102 (FIG. 3) and retainers 302, respectively, which correspond in both number and location, and are configured for (releasable) connection (engagement) so as to support assembly of the mirror assembly 10 (e.g., during installation, repair, maintenance, etc.). As discussed in further detail below, the clips 102 on the support bracket 100 each include inner and outer (first and second) arms 104i, 104ii (FIG. 10), which extend axially (forwards) towards the outer housing 500 (and away from the mirror glass 200) and define flanges 106i, 106ii, respectively, and the retainers 302 on the inner housing 300 each (first and second) pedestals 304i, 304ii that are connected by a cross-bar 306 that extends therebetween so as to define an opening 308.

Figure 8:
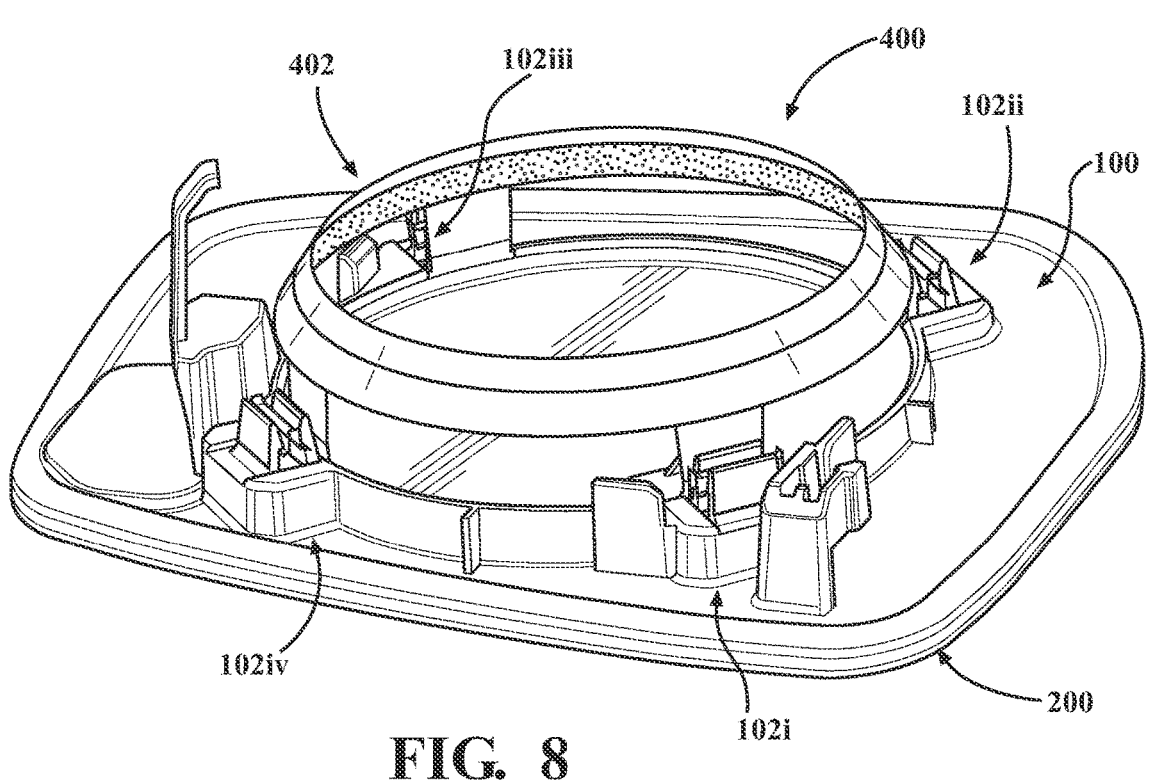
FIG. 8 is a partial, side perspective view of the mirror assembly (with the inner housing removed).

In the particular embodiment illustrated, the support bracket 100 and the inner housing 300 respectively include four clips 102i-102iv (FIG. 8) and four retainers 302i-302iv (FIGS. 2, 3), which are spaced circumferentially from each other by a (generally) equivalent angular distance of (approximately) 90°. It should be appreciated, however, that the particular number and/or spacing of the clips 102 and the retainers 302 may be altered in various embodiments without departing from the scope of the present disclosure. For example, embodiments including both greater and fewer numbers of clips 102 and retainers 302 that are spaced by lesser and greater angular distances are also contemplated herein and would not be beyond the scope of the present disclosure.

Referring now to FIGS. 4-10 as well, the anti-theft countermeasure 400 includes a (second) locking bracket 402 that is configured for positioning about the inner housing 300. As described in detail below, the locking bracket 402 includes: a body 404; bridge members 406 that extend axially (longitudinally) from the body 404; and (second) clips 408 that extend radially outward from the bridge members 406 along radial axes R. The locking bracket 402 is configured so as to define a (first) radial (transverse) cross-sectional area (footprint), which extends in orthogonal (or generally orthogonal) relation to the axis of assembly Y (FIG. 2) and in parallel (or generally parallel) relation to the radial axes R, that is less than a corresponding (second) radial (transverse) cross-sectional area (footprint) defined by the support bracket 100. As such, upon assembly of the mirror assembly 10, the locking bracket 402 is concealed, and hidden from view, by the support bracket 100 (and the mirror glass 200), as seen in FIG. 1, for example.

Figure 4:
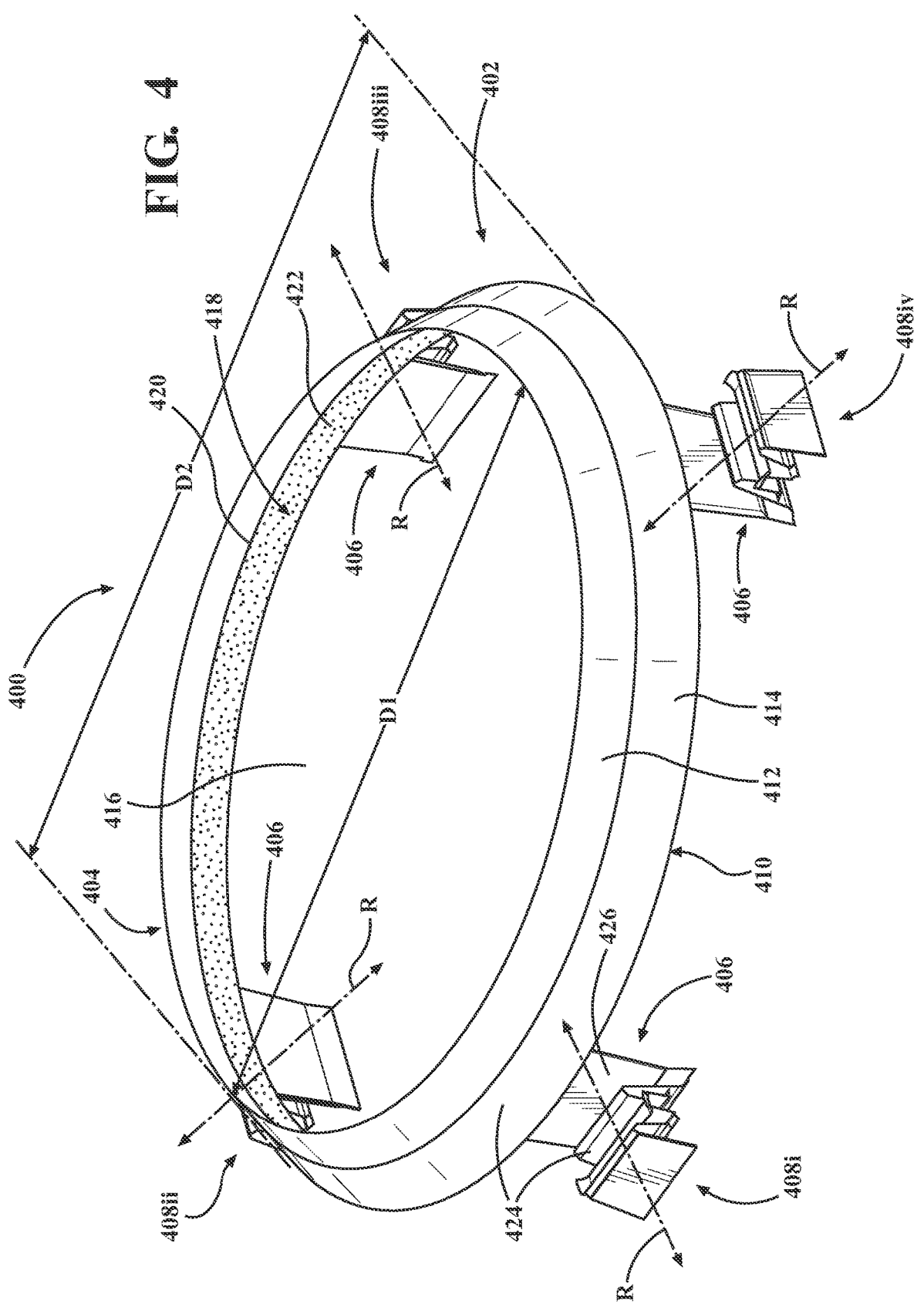
FIG. 4 is a side, perspective view of the anti-theft countermeasure.

The body includes a collar 410 that is configured in correspondence with the outer contour (profile) of the inner housing 300. As such, in the particular embodiment illustrated, the collar 410 includes a stepped, tapered profile that defines a (first) forward section 412 (located closer to a front-end of the vehicle) and a (second) rearward section 414, which is spaced closer to the mirror glass 200 (and the rear-end of the vehicle). As seen in FIG. 4, the forward section 412 defines a (first) transverse cross-sectional dimension (e.g., a diameter) D1 and the rearward section 414 defines a (second) transverse cross-sectional dimension (e.g., a diameter) D2 that exceeds the transverse cross-sectional dimension D1.

The collar 410 is integral (e.g., unitary, monolithic) in construction and defines an annular (or generally annular) aperture (window) 416 that is configured to receive the inner housing 300 such that the inner housing 300 extends into (e.g., through) the locking bracket 402. In the particular embodiment of the disclosure illustrated, the body 404 includes an adhesive 418 that is located on an inner surface 420 of the collar 410, which supports (adhesive) connection of the locking bracket 402 to the inner housing 300 and reduces (if not entirely eliminates) undesirable relative movement (e.g., shaking, rattling, etc.) between the locking bracket 402 and the inner housing 300. Although shown as a strip of double-sided tape 422 in the particular embodiment seen throughout the figures, it should be appreciated that the particular form of the adhesive 418 may be altered in various embodiments without departing from the scope of the present disclosure.

The bridge members 406 extend from the collar 410 in parallel (or generally parallel) relation to the axis of assembly Y (FIG. 2) and in transverse (e.g., orthogonal or generally orthogonal) relation to the radial axes R (FIG. 4). In certain embodiments of the disclosure, it is envisioned that the locking bracket 402 may be integrally (e.g., unitarily, monolithically) formed from a single piece of resilient material (e.g., one or more plastic materials, polymeric materials, composite materials, metallic materials, etc.), which allows the locking bracket 402 to (deform) flex (e.g., expand and contract radially along the axes R) during connection to the support bracket 100 and the inner housing 300, as described in further detail below. Alternatively, however, it is envisioned that the locking bracket 402 may include a resilient, multi-material, non-unitary construction. More specifically, in the particular embodiment illustrated throughout the figures, whereas the body 404 and the clips 408 include (e.g., are formed from) a (first) non-metallic material 424 (e.g., one or more plastic materials, polymeric materials, composite materials, etc.), the bridge members 406 include (e.g., are formed from) a (second) metallic material 426 (e.g., aluminum, steel, etc.), which, in the particular embodiment illustrated through the figures, is configured as a (first) overlay 428i (FIG. 6) that is superimposed onto the non-metallic material 424. As described in further detail below, the inclusion of one or more metallic materials 426 not only increases the strength and/or rigidity of the locking bracket 402, but inhibits radial deformation (e.g., bending) of the clips 408 to augment the theft-deterrence features (capabilities) of the locking bracket 402 and enhance securement of the locking bracket 402 to the support bracket 100 and the inner housing 300.

Figure 10:
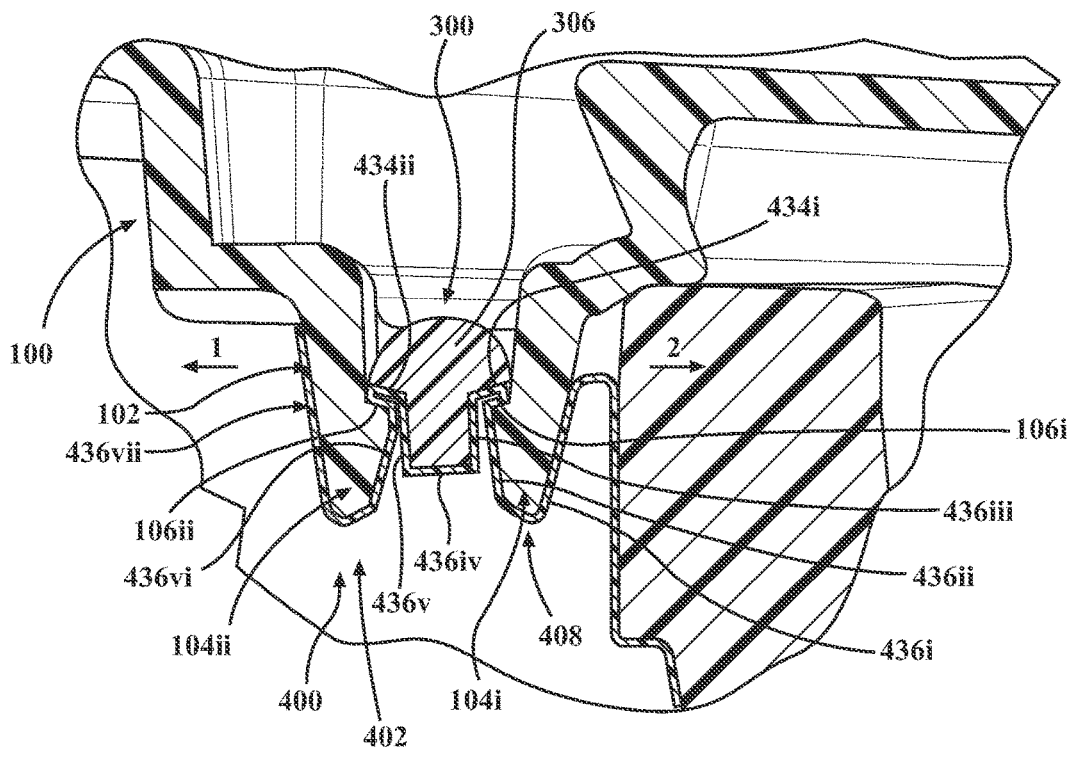
FIG. 10 is a partial, axial (longitudinal), cross-sectional view of the mirror assembly taken along line 10-10 in FIG. 9.

The clips 408 are configured for connection to (engagement with) the clips 102 (FIGS. 3, 8, 10) on the support bracket 100 and the retainers 302 on the inner housing 300. More specifically, the clips 408 are positionable between the clips 102 and the retainers 302, as seen in FIG. 10, so as to securely connect (e.g., lock) the inner housing 300 in relation to the support bracket 100 and thereby inhibit (if not entirely prevent) unauthorized (separation) detachment (e.g., theft) of the support bracket 100 and/or the mirror glass 200 from the inner housing 300, as described in further detail below. As such, in the particular embodiment illustrated, the locking bracket 402 includes four clips 408i-

408iv, which are spaced circumferentially from each other by a (generally) equivalent angular distance of (approximately) 90°. It should be appreciated, however, that the particular number and/or spacing of the clips 408 may be altered in various embodiments without departing from the scope of the present disclosure (e.g., depending upon the number of clips 102 and retainers 302 respectively included on the support bracket 100 and the inner housing 300). For example, embodiments including both greater and fewer numbers of clips 408 that are spaced by lesser and greater angular distances are also contemplated herein and would not be beyond the scope of the present disclosure.

The clips 408 are identical (or generally identical) in configuration and each include: a frame 430 (FIG. 6); alignment features 432; and anchors 434. Each frame 430 includes an "M"-shaped (or generally "M"-shaped) configuration that is defined by legs 436, which are arranged into individual frame sections 438. More specifically, the frame 430 of each clip 408 includes: a (first) frame section 438i, which includes a (first) leg 436i and a (second) leg 436ii; a (second) frame section 438ii, which includes a (third) leg 436iii, a (fourth) leg 436iv, and a (fifth) leg 436v; and a (third) frame section 438iii, which includes a (sixth) leg 436vi and a (seventh) leg 436vii.

The first leg 436i is connected to the bridge member 406 and extends therefrom in both axial (longitudinal) and radial directions along (e.g., in parallel (or generally parallel) relation to) the axes Y, R, respectively. More specifically, in the particular embodiment of the disclosure illustrated throughout the figures, the first leg 436i is formed integrally (e.g., unitarily, monolithically) with the non-metallic material 424 of the bridge member 406.

The second leg 436ii is connected to first leg 436i, and defines a (first) receptacle 440i (FIG. 6) therewith that is configured to receive the (first) arm 104i (FIG. 10) of the corresponding clip 102 on the support bracket 100. More specifically, the legs 436i, 436ii are connected so as to define a (first) living hinge 442i, which allows the frame 430 to flex radially (e.g., both inwardly towards the inner housing 300 and outwardly away from the inner housing 300) to support connection and disconnection of the locking bracket 402 and, thus, assembly and disassembly of the mirror assembly 10.

The third leg 436iii includes a (first) anchor (foot) 434i, which is connected to the second leg 436ii and is configured for positioning between (and engagement (contact) with) the inner housing 300 (e.g., the crossbar 306 of the corresponding retainer 302) and the flange 106i defined by the arm 104i of the corresponding clip 102 on the support bracket 100, as seen in FIG. 10, to thereby inhibit (if not entirely prevent) unauthorized (separation) detachment (e.g., theft) of the support bracket 100 and/or the mirror glass 200 from the inner housing 300, as described in further detail below. More specifically, the anchor 434i extends radially inward from the third leg 436iii (e.g., towards the bridge member 406 and the inner housing 300) and is angled rearwardly (e.g., towards the mirror glass 200) so as to define an angle α with the corresponding radial axis R.

The fourth leg 436iv extends transversely from the third leg 436iii in parallel (or generally parallel) relation to the corresponding radial axis R. In the particular embodiment illustrated, the fourth leg 436iv includes (first and second) alignment features 432i, 432ii, which extend outwardly therefrom and are configured for engagement (contact) with the inner housing 300 (e.g., the retainers 302) so as to facilitate proper registration (alignment) of the support bracket 100, the inner housing 300, and the locking bracket

402. More specifically, the alignment features 432*i*, 432*ii* extend outwardly from opposite (e.g., forward and rearward) ends of the fourth leg 436*iv* in transverse (e.g., orthogonal (or generally orthogonal)) relation to the corresponding radial axis R. Upon connection of the locking bracket 402 to the inner housing 300 and the support bracket 100, the alignment features 432 engage (contact) inner surfaces 310*i*, 310*ii* (FIG. 9) respectively defined by the pedestals 304*i*, 304*ii*, thereby guiding the locking bracket 402 into place.

Although shown as including a pair of alignment features 432*i*, 432*ii* in the particular embodiment illustrated throughout the figures, it should be appreciated that the particular number of alignment features 432 may be varied without departing from the scope of the present disclosure. For example, embodiments including a single alignment feature 432 (e.g., the alignment feature 432*i* or the alignment feature 432*ii*) are also envisioned herein, as are embodiments in which the alignment features 432 may be eliminated altogether.

The alignment features 432*i*, 432*ii* respectively include (first) sections 444*i*, 444*ii* that extend outwardly from the fourth leg 436*iv* (in opposite directions) and (second) sections 446*i*, 446*ii* that extend axially (longitudinally) forward from the sections 444*i*, 444*ii* (e.g., away from the mirror glass 200). Whereas the sections 444*i*, 444*ii* extend in transverse (e.g., orthogonal (or generally orthogonal)) relation to the axis of assembly Y (FIG. 2) and the corresponding radial axis R (FIGS. 4, 6), the sections 446*i*, 446*ii* extend in parallel (or generally parallel) relation to the axis of assembly Y. While the sections 446*i*, 446*ii* are illustrated as extending from the sections 444*i*, 444*ii* so as to define arcuate transitions 448, in alternate embodiments of the disclosure, it is envisioned that the sections 446*i*, 446*ii* may respectively extend from the sections 444*i*, 444*ii* in orthogonal (or generally orthogonal) relation so as to define (rectilinear or generally rectilinear) elbows.

Together with the third leg 436*iii* and the fourth leg 436*iv*, the fifth leg 436*v* defines a channel 450 (FIG. 6) that is configured to receive the crossbar 306 of the corresponding retainer 302, as seen in FIG. 10, such that the crossbar 306 is located between the legs 436*iii*, 436*iv*, 436*v* and in adjacent relation to (e.g., in engagement (contact) with) the leg 436*iv*. The fifth leg 436*v* includes a (second) anchor (foot) 434*ii*, which is identical (or generally identical) to the (first) anchor 434*i*. The anchor 434*ii* is connected to the sixth leg 436*vi* and is configured for positioning between the inner housing 300 (e.g., the crossbar 306 of the corresponding retainer 302) and the flange 106*ii* defined by the arm 104*ii* of the corresponding clip 102 on the support bracket 100 to thereby inhibit (if not entirely prevent) unauthorized (separation) detachment (e.g., theft) of the support bracket 100 and/or the mirror glass 200 from the inner housing 300, as described in further detail below. More specifically, the anchor 434*ii* extends radially outward from the fifth leg 436*v* (e.g., away from the bridge member 406 and the inner housing 300) and is angled rearwardly (e.g., towards the mirror glass 200) so as to define the (aforementioned) angle α with the corresponding radial axis R.

The sixth leg 436*vi* is connected to the anchor 434*ii* and the seventh leg 436*vii* such that the legs 436*vi*, 436*vii* define a (second) receptacle 440*ii* (FIG. 6) therewith that is configured to receive the (second) arm 104*ii* (FIG. 10) of the clip 102 on the support bracket 100, as seen in FIG. 10. More specifically, the legs 436*vi*, 436*vii* are connected so as to define a (second) living hinge 442*ii*, which allows the frame 430 to flex radially (e.g., both inwardly towards the inner housing 300 and outwardly away from the inner housing

300) to support connection and disconnection of the locking bracket 402 and, thus, assembly and disassembly of the mirror assembly 10.

The seventh leg 436*vii* extends from the sixth leg 436*vi* (via the living hinge 442*ii*) in parallel (or generally parallel) relation to the axis of assembly Y (FIG. 2) of the mirror assembly 10 and in transverse (e.g., orthogonal (or generally orthogonal)) relation to the corresponding radial axis R. As such, with reference to FIG. 6 in particular, the bridge member 406 and the legs 436*i*, 436*ii* are positioned radially inward of the anchor 434*i* (e.g., closer to the inner housing 300), the legs 436*iii*, 436*iv*, 436*v* are positioned radially between the anchors 434*i*, 434*ii*, and the legs 436*vi*, 436*vii* are positioned radially outward of the anchor 434*ii* (e.g., further from the inner housing 300).

As with the bridge members 406, the seventh leg 436*vii* includes (e.g., is formed from) the (second) metallic material 426 (e.g., aluminum, steel, etc.), which is configured as a (second) overlay 428*ii* that is superimposed onto the non-metallic material 424. As described in further detail below, inclusion of the metallic material 426 increases the strength and/or rigidity of the locking bracket 402, which inhibits radial deformation (e.g., bending) of the clips 408 to augment the theft-deterrent features (capabilities) thereof and enhance securement of the locking bracket to the support bracket 100 and the inner housing 300.

Figure 9:
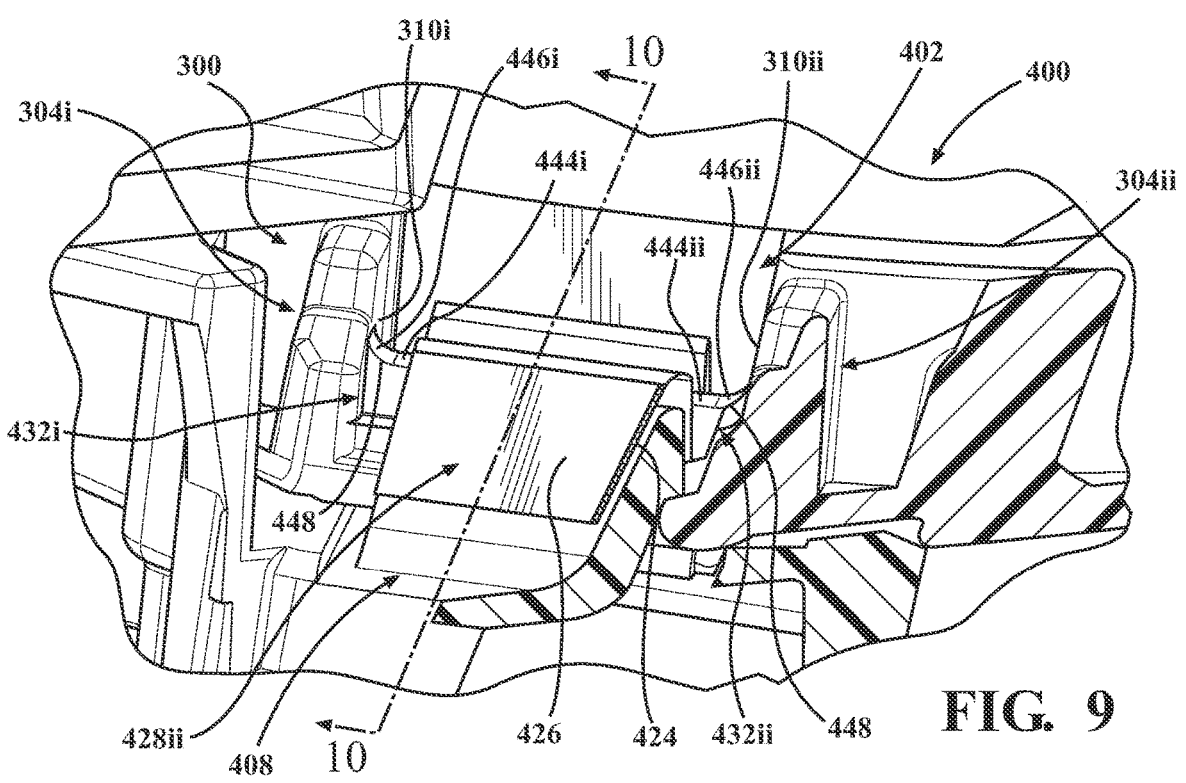
FIG. 9 is a partial, side, perspective view of the mirror assembly.

With continued reference to FIGS. 1-10, assembly of the mirror assembly 10 will be discussed. Either prior or subsequent to connection of the inner housing 300 and the support bracket 100 (e.g., via engagement of the clips 102 and the retainers 302), the anti-theft countermeasure 400 (e.g., the locking bracket 402) is positioned about the inner housing 300 such that the inner housing 300 extends into (e.g., through) the aperture 416 defined by the collar 410, as seen in FIGS. 2 and 3, which facilitates mating of the collar 410 with the outer contour of the inner housing 300 and connection of the locking bracket 402 to the inner housing 300 via the adhesive 418 (FIG. 4). Thereafter, the locking bracket 402 is connected to the support bracket 100 via advancement along the axis of assembly Y (FIG. 2) and engagement of the respective clips 408, 102 (FIGS. 2, 3) such that the inner housing 300 is located (captured) between the locking bracket 402 and the support bracket 100, as seen in FIGS. 9, 10.

Figures 5, 6:
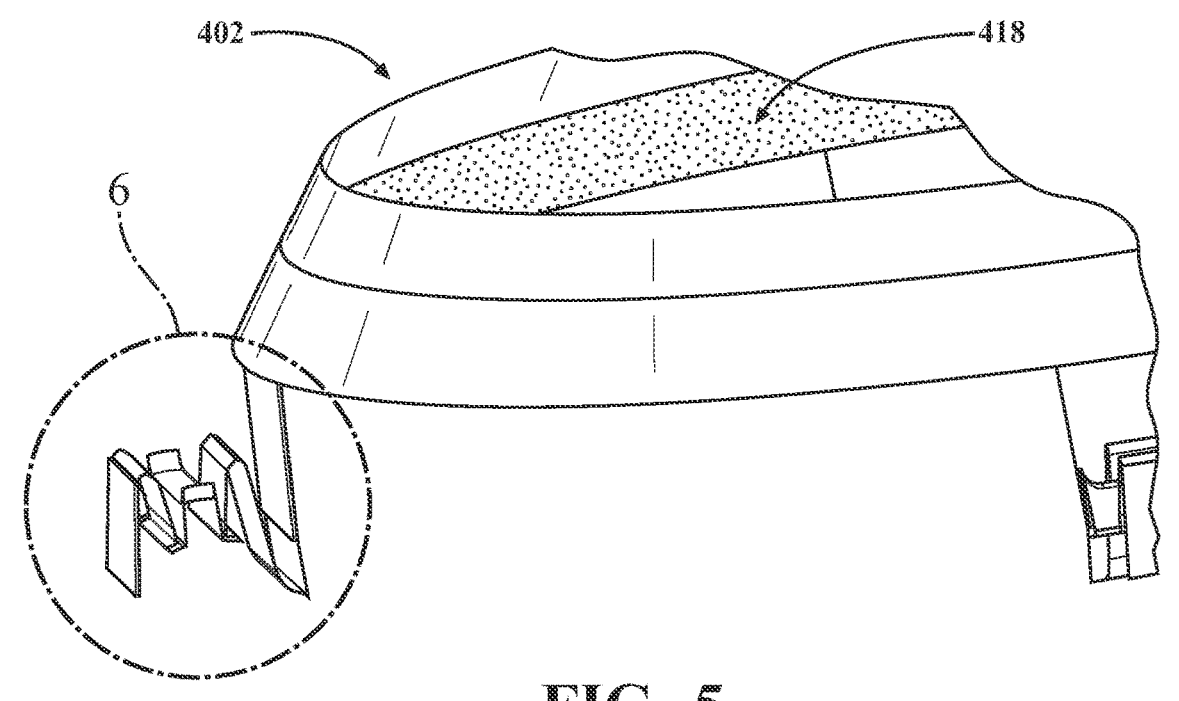
FIG. 5 is a partial, side, perspective view of the anti-theft countermeasure.
FIG. 6 is an enlargement of the area of detail identified in FIG. 5.
Figure 7:
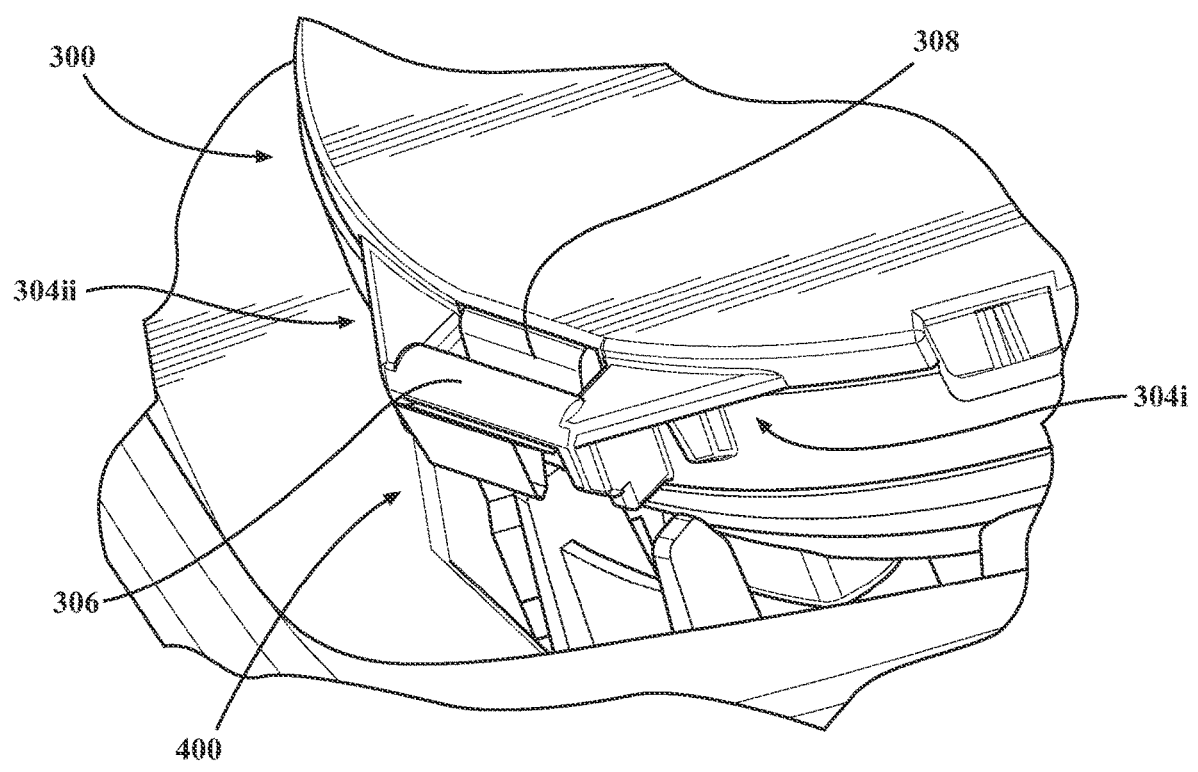
FIG. 7 is a partial, rear, perspective view of the mirror assembly.

During connection of the brackets 100, 402, the alignment features 432*i*, 432*ii* (FIGS. 6, 9) on the fourth leg 436*iv* contact the inner surfaces 310*i*, 310*ii* respectively defined by the pedestals 304*i*, 304*ii* of the retainers 302 on the inner housing 300, which facilitates proper registration (alignment) of the support bracket 100, the inner housing 300, and the locking bracket 402. As the clips 102, 408 are brought into engagement, the inner housing 300 is positioned (captured) and locked therebetween, as seen in FIG. 10. More specifically, the crossbars 306 on the retainers 302 are received by the channels 450 (FIG. 6) defined by the legs 436*iii*, 436*iv*, 436*v* of the frame sections 438*ii* such that the legs 436*iv* overlie the crossbars 306, and the arms 104*i*, 104*ii* (FIG. 10) of the clips 102 are respectively inserted into (received by) the receptacles 440*i*, 440*ii* (FIG. 6).

During respective insertion of the arms 104*i*, 104*ii* into the receptacles 440*i*, 440*ii*, the frames 430 flex as the clips 408 expand radially along the corresponding axes R (e.g., outwardly away from the inner housing 300 and/or inwardly towards the inner housing 300), which is facilitated by the living hinges 442*i*, 442*ii* (FIG. 6) and the resilient material(s) used in construction of the locking bracket 402. As the frames 430 flex and the clips 408 expand, the anchors

434*i*, 434*ii* are urged towards each other, which creates (first and second) biasing forces Fi, Fii (FIG. 6) in the clips 408 that act upon the frame sections 438*i*, 438*iii* and which are oriented in opposite radial directions. More specifically, as seen in FIG. 6, the biasing force Fi acting upon the frame section 438*i* is directed radially inward (e.g., towards the inner housing 300) and the biasing force Fii acting upon the frame section 438*iii* is directed radially outward (e.g., away from the inner housing 300). Continued insertion of the arms 104*i*, 104*ii* into the respective receptacles 440*i*, 440*ii* results in positioning of the anchors 434*i*, 434*ii* between the cross-bars 306 on the retainers 302 and the flanges 106*i*, 106*ii* (FIG. 10) respectively defined by the arms 104*i*, 104*ii* under the influence of the biasing forces Fi, Fii, which urge the anchors 434*i*, 434*ii* radially away from each other.

Positioning of the anchors 434*i*, 434*ii* between the retainers 302 and the clips 102 securely connects, and locks together, the inner housing 300 and the support bracket 100. More specifically, the anchors 434*i*, 434*ii* resist the application of any external force applied in the axial (longitudinal) direction (e.g., a pulling force applied in parallel (or generally parallel) relation to the axis of assembly Y (FIG. 2)) to thereby inhibit (if not entirely prevent) unauthorized (separation) detachment (e.g., theft) of the support bracket 100 and, thus, the mirror glass 200, from the inner housing 300.

The bridge member 406 and the seventh leg 436*vii* (FIGS. 6, 10) of the clips 408 provide an additional countermeasure to theft by concealing (covering) the clips 102, which inhibits (if not entirely prevents) the direct application of external force thereto that may otherwise result in deflection of the clips 102 (in the directions identified by arrows 1, 2 in FIG. 10) and, thus, separation of the inner housing 300 from the support bracket 100. The overlays 428*i*, 428*ii* respectively included on the bridge member 406 and the seventh leg 436*vii*, as well as the metallic material 426 comprising the overlays 428*i*, 428*ii*, further counteract any applied external force by increasing the strength and/or rigidity of the locking bracket 402, which inhibits (if note entirely prevents) (radial) deformation (e.g., bending) of the clips 408 to increase force absorption and enhance securement and connection of the inner housing 300 and the support bracket 100.

In addition to the theft-deterrent features described above, the locking bracket 402 provides improved visibility vis-à-vis known anti-theft countermeasures. For example, due to the configuration of the locking bracket 402 (e.g., the body 404, the bridge members 406, and the clips 408), the reduced surface area occupied by the locking bracket 402 (compared to the support bracket 100), and the forward location of the locking bracket 402 relative to the support bracket 100, any encroachment of the locking bracket 402 upon the mirror glass 200 is eliminated.

Moreover, the mechanical connection between the support bracket 100, the inner housing 300, and the locking bracket 402 established via engagement of the clips 102, the retainers 302, and the clips 408 eliminates the need for any (direct) adhesive connection between the locking bracket 402 and the mirror glass 200, which is often required by known anti-theft countermeasures. Such adhesive connections can be unreliable, unpredictable, and subject to failure as a result of the use of inconsistent (non-standardized) materials of construction by the OEMs.

In certain embodiments, the second clips are configured for direct engagement with the retainers and the first clips to thereby securely connect the housing to the support bracket.

In certain embodiments, the anti-theft countermeasure is configured for direct engagement with the bracket to thereby lock the housing in relation to the bracket and inhibit separation of the housing from the bracket.

In certain embodiments, the method of assembling the mirror assembly includes directly connecting the anti-theft countermeasure to the bracket such that the housing is captured therebetween.

Persons skilled in the art will understand that the various embodiments of the disclosure described herein and shown in the accompanying figures constitute non-limiting examples, and that additional components and features may be added to any of the embodiments discussed hereinabove without departing from the scope of the present disclosure. Additionally, persons skilled in the art will understand that the elements and features shown or described in connection with one embodiment may be combined with those of another embodiment without departing from the scope of the present disclosure and will appreciate further features and advantages of the presently disclosed subject matter based on the description provided. Variations, combinations, and/or modifications to any of the embodiments and/or features of the embodiments described herein that are within the abilities of a person having ordinary skill in the art are also within the scope of the disclosure, as are alternative embodiments that may result from combining, integrating, and/or omitting features from any of the disclosed embodiments.

Use of broader terms such as "comprises," "includes," and "having" should be understood to provide support for narrower terms such as "consisting of," "consisting essentially of," and "comprised substantially of." Accordingly, the scope of protection is not limited by the description set out above but is defined by the claims that follow and includes all equivalents of the subject matter of the claims.

In the preceding description, reference may be made to the spatial relationship between the various structures illustrated in the accompanying drawings, and to the spatial orientation of the structures. However, as will be recognized by those skilled in the art after a complete reading of this disclosure, the structures described herein may be positioned and oriented in any manner suitable for their intended purpose. Thus, the use of terms such as "above," "below," "upper," "lower," "inner," "outer," "left," "right," "upward," "downward," "inward," "outward," etc., should be understood to describe a relative relationship between the structures and/or a spatial orientation of the structures. Those skilled in the art will also recognize that the use of such terms may be provided in the context of the illustrations provided by the corresponding figure(s).

Additionally, terms such as "approximately," "generally," "substantially," and the like should be understood to allow for variations in any numerical range or concept with which they are associated. For example, it is intended that the use of terms such as "approximately" and "generally" should be understood to encompass variations on the order of 25%, or to allow for manufacturing tolerances and/or deviations in design.

Although terms such as "first," "second," "third," etc., may be used herein to describe various operations, elements, components, regions, and/or sections, these operations, elements, components, regions, and/or sections should not be limited by the use of these terms in that these terms are used to distinguish one operation, element, component, region, or section from another. Thus, unless expressly stated otherwise, a first operation, element, component, region, or section could be termed a second operation, element, component, region, or section without departing from the scope of the present disclosure.

Each and every claim is incorporated as further disclosure into the specification and represents embodiments of the present disclosure. Also, the phrases "at least one of A, B, and C" and "A and/or B and/or C" should each be interpreted to include only A, only B, only C, or any combination of A, B, and C.

What is claimed is:

1. A mirror assembly for a vehicle, the mirror assembly comprising:
   a support bracket including first clips;
   a mirror glass supported by the support bracket;
   a housing including retainers configured for insertion into the first clips along an axis of assembly to thereby connect the housing and the support bracket; and
   a locking bracket configured for positioning about the housing, wherein the locking bracket includes:
      a body; and
      second clips extending outwardly therefrom along radial axes in generally orthogonal relation to the axis of assembly, the second clips configured for direct engagement with the retainers and the first clips to thereby securely connect the housing to the support bracket.

2. The mirror assembly of claim 1, wherein the locking bracket is adhesively connected to the housing.

3. The mirror assembly of claim 1, wherein the second clips include alignment features configured for engagement with the retainers to facilitate proper registration of the support bracket, the housing, and the locking bracket.

4. The mirror assembly of claim 3, wherein the alignment features extend outwardly from the locking bracket in transverse relation to the radial axes.

5. The mirror assembly of claim 4, wherein the alignment features extend axially from the locking bracket and away from the mirror glass.

6. The mirror assembly of claim 1, wherein the second clips include anchors configured for positioning between the support bracket and the housing to inhibit separation of the support bracket and the mirror glass from the housing.

7. The mirror assembly of claim 6, wherein the anchors extend radially from the second clips.

8. The mirror assembly of claim 6, wherein the first clips include arms extending towards the housing, and the second clips define receptacles configured to receive the arms.

9. The mirror assembly of claim 8, wherein the second clips each include a first leg positioned radially inward of the anchors and a second leg positioned radially outward of the anchors, the receptacles being defined by the first leg and the second leg.

10. The mirror assembly of claim 1, wherein the second clips include a non-metallic material and a metallic material, the metallic material inhibiting radial deformation of the second clips.

11. The mirror assembly of claim 1, wherein the body is configured to receive the housing.

12. The mirror assembly of claim 11, wherein the body includes a collar defining an aperture configured to receive the housing such that the housing extends into the collar.

13. A mirror assembly for a vehicle, the mirror assembly comprising:
   a bracket supporting a mirror glass;
   a housing located forwardly of the bracket and configured for connection thereto; and
   an anti-theft countermeasure located forwardly of the housing such that the housing is positioned between the bracket and the anti-theft countermeasure along an axis of assembly, wherein the anti-theft countermeasure is configured for direct engagement with the bracket and the housing such that the anti-theft countermeasure is captured between the bracket and the housing along the axis of assembly to thereby lock the housing in relation to the bracket and inhibit separation of the housing from the bracket.

14. The mirror assembly of claim 13, wherein the anti-theft countermeasure includes clips extending outwardly therefrom along radial axes, the clips being configured for positioning between the bracket and the housing.

15. The mirror assembly of claim 14, wherein the clips include:
   anchors configured for engagement with corresponding flanges defined by arms extending from the bracket such that the anchors are positionable between the flanges and the housing;
   a first leg positioned radially inward of the anchors; and
   a second leg positioned radially outward of the anchors.

16. The mirror assembly of claim 14, wherein the clips include a non-metallic material and a metallic material.

17. The mirror assembly of claim 16, wherein the metallic material is configured as an overlay and inhibits radial deformation of the clips.

18. A method of assembling a mirror assembly for a vehicle, the method comprising:
   connecting a housing to a bracket along an axis of assembly, wherein the bracket is configured to support a mirror glass;
   positioning an anti-theft countermeasure about the housing such that the housing extends into the anti-theft countermeasure; and
   connecting the anti-theft countermeasure to the housing and the bracket such that the anti-theft countermeasure is in direct contact therewith, wherein the anti-theft countermeasure is captured between the housing and the bracket along the axis of assembly.

19. The method of claim 18, wherein connecting the anti-theft countermeasure to the bracket includes positioning anchors on the anti-theft countermeasure between the housing and corresponding flanges defined by arms extending from the bracket.

20. The method of claim 19, wherein connecting the anti-theft countermeasure to the bracket includes inserting the arms into receptacles defined by the anti-theft countermeasure.

* * * * *